United States Patent
Cao et al.

(10) Patent No.: US 11,645,283 B2
(45) Date of Patent: May 9, 2023

(54) PREDICTIVE QUERY PROCESSING

(71) Applicant: INTERNATIONAL BUSINESS MACHINES CORPORATION, Armonk, NY (US)

(72) Inventors: Li Cao, Beijing (CN); Shuo Li, Beijing (CN); Xiaobo Wang, Beijing (CN); Xin Peng Liu, Beijing (CN); Sheng Yan Sun, Beijing (CN)

(73) Assignee: International Business Machined Corporation, Armonk, NY (US)

( * ) Notice: Subject to any disclaimer, the term of this patent is extended or adjusted under 35 U.S.C. 154(b) by 186 days.

(21) Appl. No.: 17/240,831

(22) Filed: Apr. 26, 2021

(65) Prior Publication Data

US 2022/0342887 A1    Oct. 27, 2022

(51) Int. Cl.
  *G06F 16/2453*   (2019.01)
  *G06N 20/00*     (2019.01)

(52) U.S. Cl.
  CPC ....... *G06F 16/24549* (2019.01); *G06N 20/00* (2019.01)

(58) Field of Classification Search
  CPC .......................... G06F 16/24549; G06N 20/00
  See application file for complete search history.

(56) References Cited

U.S. PATENT DOCUMENTS

| | | | | |
|---|---|---|---|---|
| 7,310,638 | B1 * | 12/2007 | Blair ................. | G06F 16/24568 |
| 7,958,113 | B2 * | 6/2011  | Fan ................... | G06F 16/24545 |
|           |      |         |                       | 707/718 |
| 8,688,683 | B2   | 4/2014  | Simon et al. | |
| 8,924,402 | B2   | 12/2014 | Fuh et al. | |
| 2008/0195577 | A1 * | 8/2008 | Fan ................... | G06F 16/24545 |
| 2012/0296936 | A1 * | 11/2012 | Nagatoshi ........... | G06F 16/2453 |
|              |      |         |                        | 707/E17.014 |
| 2013/0138630 | A1 * | 5/2013 | Yang ................... | G06F 16/2453 |
|              |      |         |                        | 707/716 |
| 2013/0159286 | A1   | 6/2013 | Manzano Macho et al. | |
| 2013/0166480 | A1 * | 6/2013 | Popescu ................. | G06N 20/00 |
|              |      |         |                        | 706/12 |
| 2015/0310066 | A1 * | 10/2015 | Beavin ............... | G06F 16/24542 |
|              |      |         |                        | 707/716 |
| 2015/0379077 | A1 * | 12/2015 | Grosse ............... | G06F 16/24542 |
|              |      |         |                        | 707/718 |

(Continued)

OTHER PUBLICATIONS

Stoyanovich, J., Ross, K. A., Rao, J., Fan, W., Markl, V., & Lohman, G. (2008). ReoptSMART: A Learning Query Plan Cache. (Year: 2008).*

(Continued)

*Primary Examiner* — William Spieler
(74) *Attorney, Agent, or Firm* — Eric Chesley; George Blasiak; Heslin Rothenberg Farley & Mesiti, P.C.

(57) ABSTRACT

Methods, computer program products, and systems are presented. The method computer program products, and systems can include, for instance: receiving an incoming query statement, wherein the incoming query statement comprises a query statement expression that includes an input variable; predicting an input variable value associated to the input variable; selecting an access path for runtime execution of the query statement in dependence on the predicted input variable value; and performing runtime execution of the query statement using the selected access path.

25 Claims, 9 Drawing Sheets

(56) References Cited

U.S. PATENT DOCUMENTS

| | | | |
|---|---|---|---|
| 2017/0017686 A1* | 1/2017 | Feng | G06F 16/24534 |
| 2017/0017689 A1* | 1/2017 | Scheibli | G06F 16/2453 |
| 2017/0039267 A1 | 2/2017 | Shmiel et al. | |
| 2017/0193398 A1 | 7/2017 | Schmidt | |
| 2017/0249360 A1* | 8/2017 | Alpers | G06F 16/24544 |
| 2017/0262502 A1* | 9/2017 | Rastunkov | G06F 16/2452 |
| 2018/0232461 A1 | 8/2018 | Fu | |
| 2019/0354621 A1* | 11/2019 | Wang | G06F 16/2453 |

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

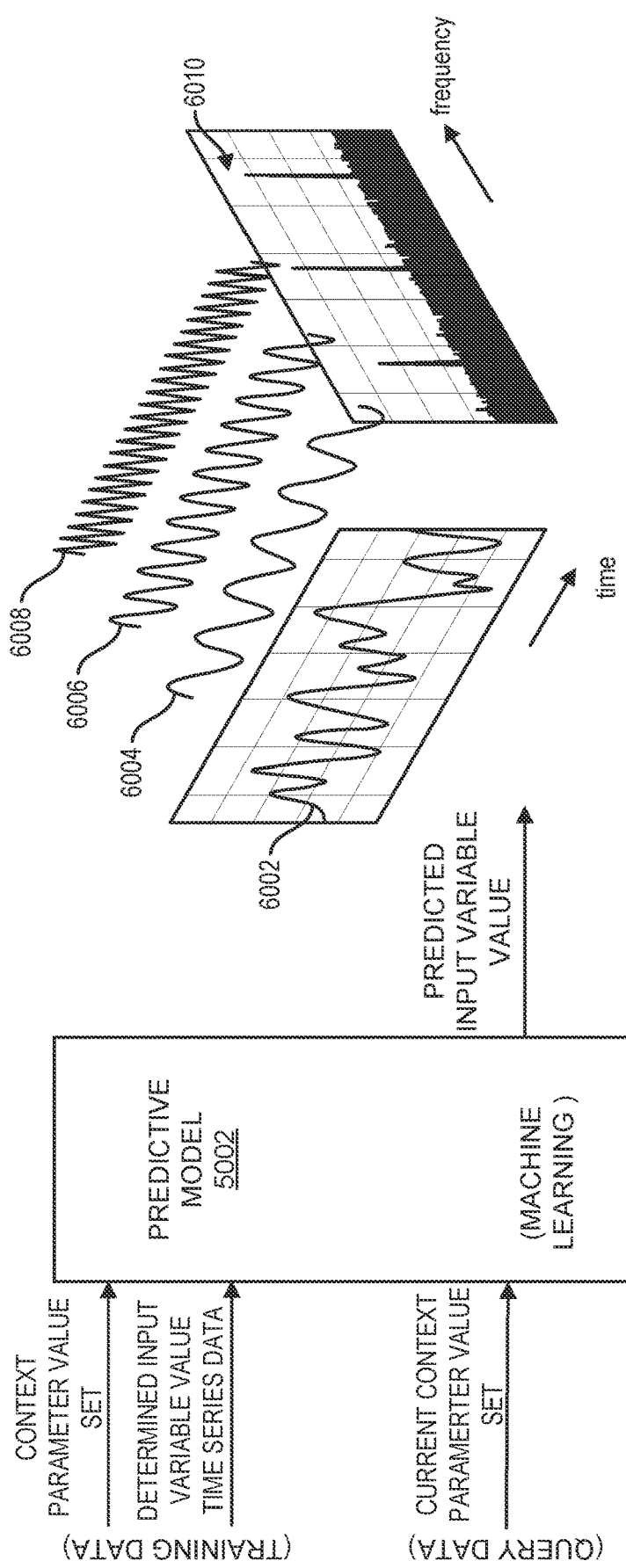

PREDICTIVE QUERY PROCESSING

BACKGROUND

Databases can be defined by an organized collection of data accessed electronically from a computer system. Databases can have associated Database Management Systems (DBMS). Database data can be organized in a series of tables having rows and columns of data. Database tables, in turn, can include one or more index. An index can be provided by a data structure that improves access to a database table.

Structured Query Language (SQL) is a domain specific language used in programming data management in a Database Management System (DBMS). SQL query statements can be used for the performance of various database operations, such as INSERT, UPDATE, SELECT, and DELETE query operations. INSERT operations can be used for performance of input of a record into a database table, SELECT operations can be used to retrieve data from a database table, UPDATE operations can be used for changing a value within a database table, and DELETE operations can be used for removal of data from a database table.

SQL can be used for programming and managing data of a relational data stream management system (RDSMS). SQL can be used for handling structured data where the defined relationships are trained different entities and/or variables of the data. SQL can include various sublanguages including the Data Query Language (DQL), Data Definition Language (DDL), Data Control Language (DCL), and Data Manipulation Language (DML). With the use of SQL various operations can be performed on a database including. e.g., data query, data manipulation (insert, update, and/or delete), data definition (schema creation and modification), and data access control.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: receiving an incoming query statement, wherein the incoming query statement comprises a query statement expression that includes an input variable; predicting an input variable value associated to the input variable; selecting an access path for runtime execution of the query statement in dependence on the predicted input variable value; and performing runtime execution of the query statement using the selected access path.

In another aspect, a computer program product can be provided. The computer program product can include a computer readable storage medium readable by one or more processing circuit and storing instructions for execution by one or more processor for performing a method. The method can include, for example: receiving an incoming query statement, wherein the incoming query statement comprises a query statement expression that includes an input variable; predicting an input variable value associated to the input variable; selecting an access path for runtime execution of the query statement in dependence on the predicted input variable value; and performing runtime execution of the query statement using the selected access path.

In a further aspect, a system can be provided. The system can include, for example a memory. In addition, the system can include one or more processor in communication with the memory. Further, the system can include program instructions executable by the one or more processor via the memory to perform a method. The method can include, for example: receiving an incoming query statement, wherein the incoming query statement comprises a query statement expression that includes an input variable; predicting an input variable value associated to the input variable; selecting an access path for runtime execution of the query statement in dependence on the predicted input variable value; and performing runtime execution of the query statement using the selected access path.

Shortcomings of the prior art are overcome, and additional advantages are provided, through the provision, in one aspect, of a method. The method can include, for example: receiving an incoming query statement, wherein the incoming query statement comprises a query statement expression that includes an input variable; selecting an access path for runtime execution of the query statement; performing runtime execution of the query statement using the selected access path, wherein the performing runtime execution of the query statement includes determining an input variable value for the input variable; applying the determined input variable value as training data for training a predictive model, wherein the predictive model is configured to return predictions for input variable values associated to the input variable; receiving a subsequent instance of the incoming query statement, wherein the incoming query statement comprises the query statement expression that includes the input variable; interrogating the predictive model to predict an input variable value for the input variable in the subsequent instance of the incoming query statement; selecting an access path for runtime execution of the subsequent instance of the query statement in dependence on the predicted input variable value; and performing runtime execution of the subsequent instance of the query statement using the selected access path.

In another aspect, a computer program product can be provided. The computer program product can include a computer readable storage medium readable by one or more processing circuit and storing instructions for execution by one or more processor for performing a method. The method can include, for example: receiving an incoming query statement, wherein the incoming query statement comprises a query statement expression that includes an input variable; selecting an access path for runtime execution of the query statement; performing runtime execution of the query statement using the selected access path, wherein the performing runtime execution of the query statement includes determining an input variable value for the input variable; applying the determined input variable value as training data for training a predictive model, wherein the predictive model is configured to return predictions for input variable values associated to the input variable; receiving a subsequent instance of the incoming query statement, wherein the incoming query statement comprises the query statement expression that includes the input variable; interrogating the predictive model to predict an input variable value for the input variable in the subsequent instance of the incoming query statement; selecting an access path for runtime execution of the subsequent instance of the query statement in dependence on the predicted input variable value; and performing runtime execution of the subsequent instance of the query statement using the selected access path.

In a further aspect, a system can be provided. The system can include, for example a memory. In addition, the system can include one or more processor in communication with the memory. Further, the system can include program instructions executable by the one or more processor via the memory to perform a method. The method can include, for example: receiving an incoming query statement, wherein the incoming query statement comprises a query statement expression that includes an input variable; selecting an access path for runtime execution of the query statement; performing runtime execution of the query statement using the selected access path, wherein the performing runtime execution of the query statement includes determining an input variable value for the input variable; applying the determined input variable value as training data for training a predictive model, wherein the predictive model is configured to return predictions for input variable values associated to the input variable; receiving a subsequent instance of the incoming query statement, wherein the incoming query statement comprises the query statement expression that includes the input variable; interrogating the predictive model to predict an input variable value for the input variable in the subsequent instance of the incoming query statement; selecting an access path for runtime execution of the subsequent instance of the query statement in dependence on the predicted input variable value; and performing runtime execution of the subsequent instance of the query statement using the selected access path.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5 depicts a predictive model according to one embodiment;

FIG. 6 depicts an output by discrete Fourier transform analysis according to one embodiment

DETAILED DESCRIPTION

Figure 1:
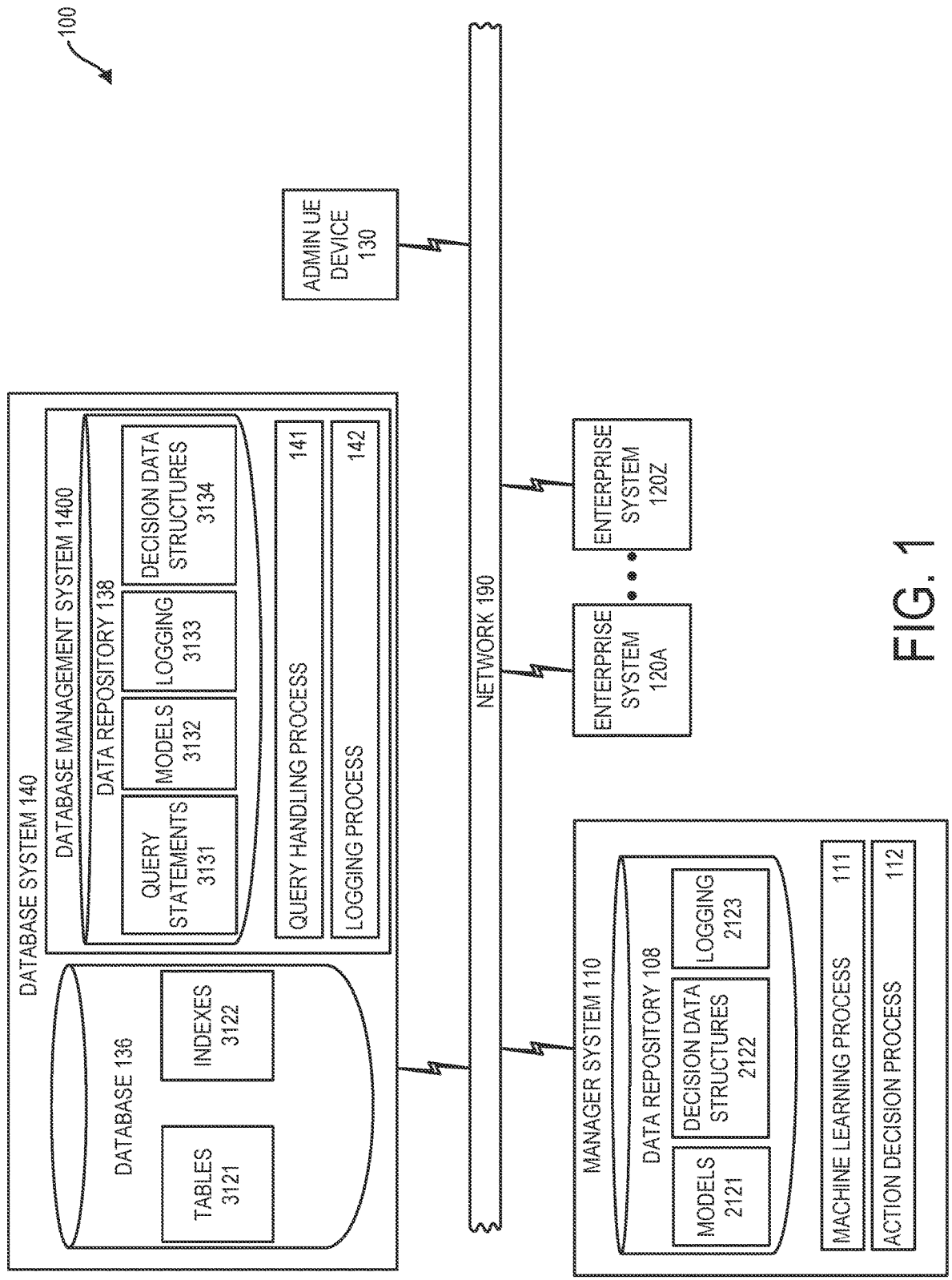
FIG. 1 depicts a system having a database system, a manager system, Enterprise systems, and an administrator client computer device according to one embodiment.

System 100 for use in improving response time of databases is set forth in one embodiment in FIG. 1. System 100, according to one embodiment, can include manager system 110 having an associated data repository 108, enterprise systems 120A-120Z, administrator client computer device 130, and database system 140. Manager system 110, enterprise systems 120A-120Z, administrator client computer device 130, and database system 140 can be provided by computing node based devices and systems and can be in communication with one another via network 190, according to one embodiment. Network 190 may be a physical network and/or a virtual network. A physical network can be, for example, a physical telecommunications network connecting numerous computer nodes or systems, such as computer servers and computer clients. A virtual network can, for example, combine numerous physical networks or parts thereof into a logical virtual network. In another example, numerous virtual networks can be defined over a single physical network.

According to one embodiment, each of manager system 110, enterprise systems 120A-120Z, administrator client computer device 130, and database system 140 can be external to one another, e.g., located on different computing nodes, e.g., different physical computing nodes. According to one embodiment, one or more of manager system 110, enterprise systems 120A-120Z, administrator client computer device 130, and database system 140 can be collocated at least one of manager system 110, enterprise systems 120A-120Z, or administrator client computer device 120, or database system 140.

According to one embodiment, database system 140 can be provided by a Structured Query Language (SQL) database system that is able to respond to SQL based query statements. In the course of use of system 100, database system 140 can receive queries from one or more enterprise system of Enterprise systems 130A-130Z. Queries received by database system 140 can take the form of query statements such as SQL statements. Database system 140 can include database 136 and database management system (DBMS) 1400. Database 136 can include tables 3121 and indexes 3122. Tables 3121 can logically organize data into columns and rows of data. A row of data within a table can define a record. Each table of tables 3121 can have associated thereto zero or more indexes of indexes 3122.

Embodiments herein recognize that with existing approaches for processing query statements, access paths for use in performing runtime execution processing can be selected prior to the time of determination of a query statement input variable value associated to an input variable of the query statement. Selection of a plurality of candidate access paths can be subject to a cost analysis in which candidate access paths can be scored. Embodiments herein recognize that access path selecting can be improved with use of a method that includes predicting query statement input variable values associated to input variables of a query statement. According to one embodiment, DBMS 1400 can be configured to (a) predict a query statement input variable value associated to a query statement input variable; and (b) select an access path from the candidate access paths in dependence on the predicted query statement input variable value. According to one specific embodiment, DBMS 1400 can be configured to (a) predict a query statement input variable value associated to a query statement input variable; (b) select a filter factor used in the scoring of a candidate access path in dependence on the predicted query statement input variable value; (c) perform cost scoring of candidate access paths using the applied filter factor, and (d) select an access path from the candidate access paths based on the cost scoring.

An access path can be characterized by one or more of (a) an access method characteristic, (b) a join sequence characteristic, (c) a join method characteristic, and/or (d) a sort selection characteristic.

An (a) access method characteristic can refer to the manner in which to access a base table. According to one embodiment there can be two ways: (1) Table Scan (Relational Scan): can refer to scanning the records from this base table from the 1 st row to last row, and pick up the rows which qualify predicates specified in SQL; and (2) Index Scan can refer to use of an index to access the records within base tables. A database performing a table scan can, e.g., according to one embodiment, read all rows of a table and apply one or more selection criterion to rows within a table. The rows in a table can be processed without a guaranteed order, but typically can be processed sequentially. For certain query statement values, a table scan can reduce page I/O operations through asynchronous pre-fetching of rows. A production database according to one embodiment can request large I/Os to bring as many rows as possible into main memory for processing, and can asynchronously pre-fetch data for assurance that a table scan operation does not wait for rows to be paged into memory. According to an index scan, a database can access an index to narrow a set of qualifying rows, e.g., by scanning rows in a specified range of the index. When scanning rows in a specified range of an index, a production database can determine an index scan range by values of a query statement against which index columns are being compared. In the case of an index-only scan, because all of the requested data is in the index, a production database may not access an indexed table.

A (b) join sequence characteristic can refer to the join 'order' of two base table joins, e.g., an Inner Join or an Outer Join.

A (c) join method characteristic can refer to the manner in which to connect two tables during join. According to one embodiment, a join method can include, e.g., Nest Loop Join, Merge Sort Join, Hybrid Join, and/or Hash Join. FIG. 6 depicts a Nest Loop Join, for example. According to a Nest Loop Join, there can be performed, e.g., a scan of an inner table for each accessed row of an outer table, or an index lookup on an inner table for each accessed row of an outer table.

A (d) sort characteristic can refer to the sort operation within a database. Examples can include, e.g.: GROUP BY, ORDER BY operation.

A query statement processed by DBMS 1400 can include one or more input variable that is replaced by an input variable value during runtime execution of a query statement. An input variable can be provided by a host variable or a parameter marker. Query statements can include static query statements and/or dynamic query statements. A static query statement can include an input variable provided by a host variable and dynamic query statement can include an input variable provided by a parameter marker. A host variable can refer, e.g., to a variable in a host language such as a PL/I variable, C variable, Fortran variable, REXX variable, Java variable, COBOL data item, or Assembler language storage area. A host variable can refer, e.g., to a host language construct that was generated by an SQL pre-compiler from a variable declared using SQL extensions. An application can associate parameter markers to application variables. A parameter marker can be provided by a place holder in a query statement whose value is obtained during statement execution.

An example query statement is set forth in Table A herein below.

TABLE A

SELECT ....
FROM CUSTOMER C, ORDER O, LINEITEM L, NATION N
WHERE C_CUSTKEY = O_CUSTKEY
AND L_ORDERKEY = O_ORDERKEY
AND C_NATIONKEY = N_NATIONKEY
AND O_ORDERDATE >= ?
AND O_ORDERDATE < ?
AND L_RETURNFLAG = ?
GROUP BY C_CUSTKEY,
C_NAME, C_ACCTBAL, C_PHONE, N_NAME,
C_ADDRESS, C_COMMENT
  ORDER BY RENEUE DESC;

In the example of Table A, the query statement expressions "AND O_ORDERDATE>=?" "AND O_ORDERDATE<?", and "AND L_RETURNFLAG=?" include respective input variables that are replaced with input variable values that are determined during runtime execution of the query statement of Table A.

Embodiments herein can include predicting one or more query statement input variable value of a query statement and selecting an access path for runtime execution of the query statement in dependence on the input variable value of a query statement. Embodiments herein can include predicting one or more query statement input variable value of a query statement prior to runtime execution of the query statement and selecting an access path for runtime execution of the query statement in dependence on the input variable value of a query statement. Embodiments herein can include predicting one or more query statement input variable value of a query statement prior to determining the one or more query statement input variable value during runtime execution of the query statement and selecting an access path for runtime execution of the query statement in dependence on the input variable value of a query statement.

Embodiments herein recognize challenges with existing approaches for processing of query statements. According to one existing approach for processing query statements a database system can establish an access path for use in performing runtime execution processing based on cost analysis during bind time processing to analyze different generated candidate access paths. In the case of a static query statement, according to an existing approach, a production database can perform bind time processing for establishing an access path in response to a first receipt of a certain static query statement, and can use the established access path for performing runtime execution in response to subsequent receipts of the certain static query statement. In the case of a dynamic query statement, according to an existing approach, a database can perform bind time processing for establishing an access path in response to a first and each subsequent receipt of the certain dynamic query statement. In either the case of processing a static query statement or a dynamic query statement a production database according to an existing approach can establish an access path during bind time processing and can execute the query statement in accordance with the established access path during runtime processing.

Embodiments herein recognize that while query statement input variable values can be unknown during bind time processing, performance of the established access path may vary significantly for different query statement input variable values that are later determined returned at execution runtime for runtime execution of a query statement. Embodiments herein recognize that access path selection for selecting an optimized access path can be significantly improved by predicting an input variable value prior to its determination during runtime execution, and selecting an access path for runtime execution of a query statement in dependence on the predicted input variable value. Embodiments herein recognize that selecting an access path in dependence on a predicted input variable value can result in an access path being selected that is more likely to exhibit optimized performance.

DBMS 1400 can run various processes including query handling process 141 for processing a query statement, and logging process 142. DBMS 1400 running query handling process 141 for processing a query statement can include DBMS 1400 performing bind time processing of a query statement and performing runtime execution processing of a query statement. In performing bind time processing of a query statement, DBMS 1400 can select an access path for execution of a query statement in dependence on a predicted input variable value for a query statement. For predicting a query statement input variable value, DBMS 1400 can identify a query statement and an associated input variable can and interrogate a predictive model associated to the query statement and associated input variable for return of a predicted input variable value. For identification of a query statement, DBMS 1400 can perform examining metadata associated to a query statement. The examination of metadata can include cross referencing metadata of an incoming query statement to query statement identifying metadata of data repository 138 of DBMS 1400.

Data repository 138 of DBMS 1400 can be a logical data repository that can store various data including data for use in processing of query statements. Data repository 138 in query statements area 3131 can store identifying metadata that identifies historical query statements that have been processed by data repository 138. During a deployment period of database system 140, it can be expected that a common query statement can be processed hundreds or thousands or more times in a deployment period of database system 140. Database system 140 in its operation can be contemporaneously processing, e.g., tens, hundreds, or thousands of different query statements contemporaneously. Metadata identifying a query statement can include, e.g., an arbitrarily assigned identification label, and/or a schema signature identifier extracted by examination of a schema of a query statement. Associated to each instance of metadata identifying a unique query statement within query statements area 3131 there can be stored attribute data that specifies attributes of the identified query statement. Attribute data can include, e.g., identifiers for one or more input variable for the query statement as well as identifiers of predictive models associated to the one or more input variable.

In models area 3132, data repository 138 can store trained and active predictive models associated to query statement expressions that include input variables. Trained and active predictive models stored in models area 3132 can predict query statement input variable values associated to input variables of query statement expressions. System 100 can be operative so that manager system 110 on the training of predictive model for predicting a host variable value determined to be active and performing predictions according to a threshold satisfying accuracy can push the active predictive model to database system 140 for storage in data repository 138.

In logging area 3133, data repository 138 can store logging data retuned from historical executions of query statements. Logging data can include a history of input variable values associated to query statements. Logging data can also include statistical logging data indicting, e.g., sizes of tables throughout time, sizes of returned datasets returned from execution of a query statement, and identifiers of historical table records returned from historical executions of query statements.

In decision data structures area 3134, data repository 138 can store decision data structures for use by DBMS 1400 in evaluating a received query statement. Examples of such decision data structures can include mapping decision data structures that facilitate cost scoring of candidate access paths. Such mapping decision data structures can include mapping decision data structures that map query statement expressions to filter factor values.

DBMS 1400 when running query handling process 141 for processing an incoming query statement can, on the identification of a query statement and one or more associated input variable value, examine models area 3132 of data repository 138 to identify any active predictive models for the query statement that can return a prediction for one or more input variable value of the query statement. On the identification of an active predictive model for predicting a query statement input variable value, DBMS 1400 can interrogate the active predictive model for return of a predicted query statement input variable value associated to the input variable. DBMS 1400 can then select an access path for execution of a query statement in dependence on the predicted query statement input variable value associated to the input variable.

In one specific embodiment, DBMS 1400 can perform cost scoring of respective candidate access paths using the predicted input variable value and can select one of the candidate access paths for execution of a query statement in dependence on the scoring.

DBMS 1400 running query handling process 141 can, on the selection of an access path, perform runtime execution processing of the query statement using the selected access path.

DBMS 1400 running logging process 142 can generate logging data respecting executed query statements executed by DBMS 1400. Logging data can include for respective query statements handled by DBMS 1400 input variable values associated to input variables of query statements.

Logging data can also include statistical logging data indicting. e.g., sizes of tables throughout time, and sizes of returned dataset returned from execution of a query statement, and identifiers of historical table records returned from historical executions of query statements. DBMS 1400 running logging process 142 can store generated logging data into logging area 3133 of data repository 138, and can push select logging data to manager system 110 for use by manager system 110 in training predictive models that predict query statement input variable values associated to input variables. DBMS 1400 running logging process 142 can include DBMS 1400 iteratively sending logging data generated by logging process 142 for handling by manager system 110. DBMS 1400 running logging process 142 can send logging data to manager system 110 at timed intervals or alternatively at the conclusion of execution of each respective incoming query statement. Logging data sent by DBMS 1400 can include logging data that specifies for respective one or more input variable of a query statement determine input variable values returned by execution of the query statement. The determine input variable values can be determined during execution runtime of a query statement.

On receipt of logging data by manager system 110, manager system 110 can use the received logging data to train predictive models. The predictive models trained by manager system 110 can include predictive models that predict query statement input variable values associated to input variables of a query statement. Manager system 110 as shown in FIG. 1 can be responsible for training of predictive models and pushing active trained predictive models for use by database system 140 in performing of query handling process 141 to process query statements.

Manager system 110 in data repository 108 can include in models area 2121 predictive models subject to training by manager system 110. In decision data structures area 2122, data repository 108 can store decision data structures for use in return of action decisions by manager system 110. Action decisions can include, e.g., action decisions to activate a predictive model. A predictive model can activate when the predictive model produces a prediction exhibiting a threshold satisfying level of accuracy.

Data repository 108 in logging area 2123 can store logging data that specifies, for historical executions of query statements, historical query statement input variable values associated to input variables. The logging data can include logging data received by database system 140 from DBMS 1400 by the performance of logging process 142 by DBMS 1400. Manager system 110 can use logging data of logging area 2123 for training of predictive models that predict host variable values associated to query statement input variables. Manager system 110 running machine learning process 111 can train predictive models of models area 2121. A respective query statement handled by database system 140 can include one or more input variable for which a host variable value is determined for replacing the input variable during runtime execution of the query statement. Data repository 108 in models area 2121 can store a predictive model for each respective input variable associated to respective query statements handled by database system 140.

Manager system 110 running machine learning process 111 can iteratively train the described predictive models associated to input variables of respective query statements handled by database system 140. Manager system 110 running machine learning process 111 can include manager system 110 iteratively training each described model using most recently received logging data received from DBMS 1400. The logging data can include mapping data between query statement input variables and determined input variable values from most recent executions of query statements handled by database system 140. Manager system 110 running action decision process 112 can include manager system 110 determining that a certain predictive model is returning a prediction for query statement input variable value that satisfies a threshold accuracy condition. For performing such action decision, manager system 110 running action decision process 112 can examine a prediction produced by a predictive model against ground truth data defined by holdout data associated to the predictive model.

Manager system 110 running action decision process 112 can include manager system 110 controlling an active/inactive flag status label associated to a predictive model responsively to a determination of whether a predictive model is returning a prediction satisfying a threshold accuracy condition. Manager system 110 running action decision process 112 can return an action decision to push an active trained predictive model to database system 140 for storage into models area 3132 responsively to a determination that a predictive model is producing a prediction satisfying a threshold accuracy, as can be specified by the active status label associated to the predictive model. Once pushed to database system 140, database system 140 running query handling process 141 can use the active predictive model in processing an incoming query statement.

Figure 2:
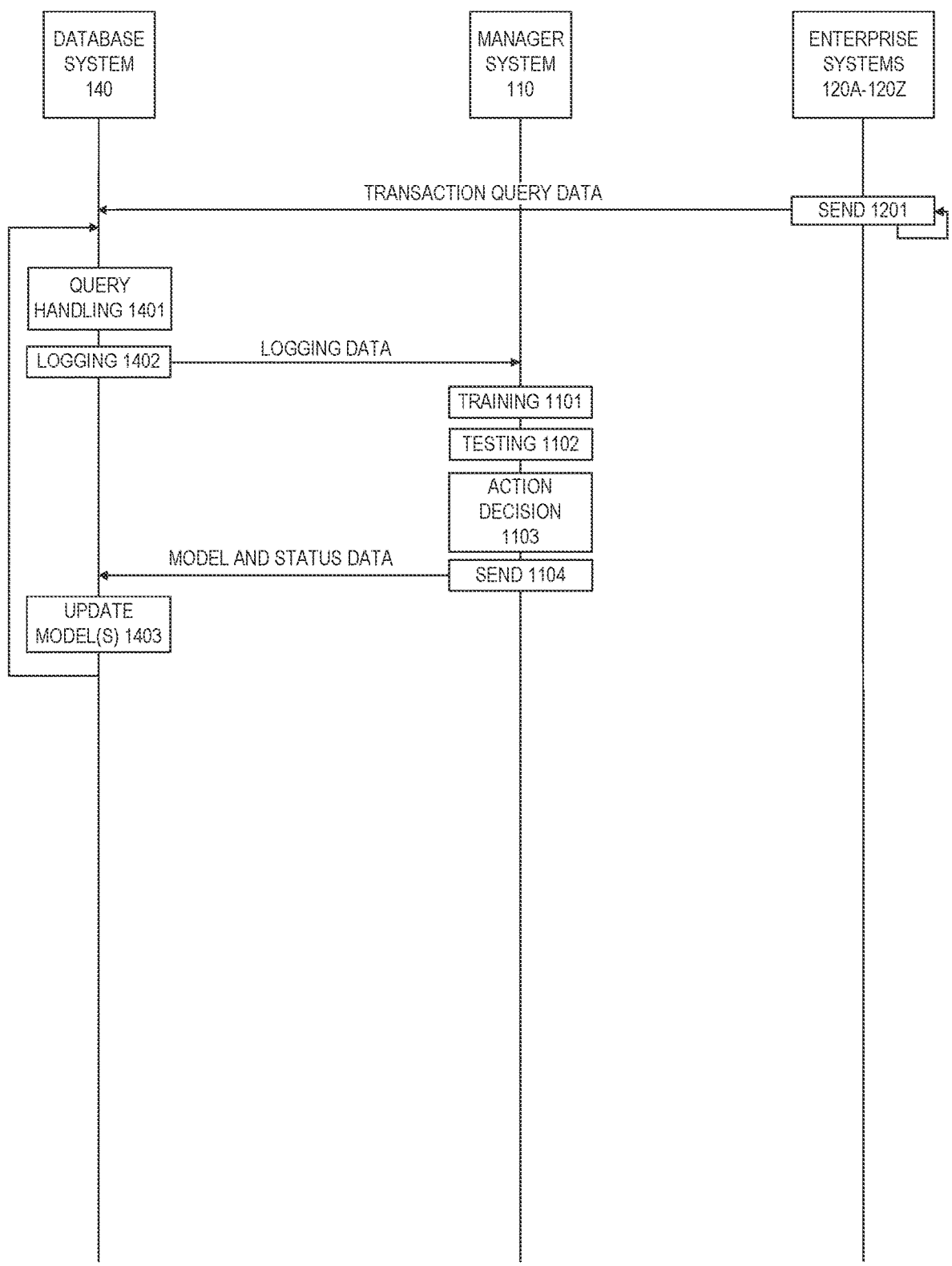
FIG. 2 is a flowchart illustrating a method for performance by a database system interoperating according to one embodiment.

Referring to the flowchart of FIG. 2, a method for performance by database system 140 interoperating with enterprise systems 120A-120Z and manager system 110 is described. At block 1201, enterprise systems 120A-120Z can be iteratively sending transaction query data for receipt by database system 140. The transaction query data sent at block 1201 can be defined by query statements from a plurality of enterprise systems. On receipt of respective query statements, database system 140 at block 1401 can perform query handling block 1401. DBMS 1400 performing query handling process at block 1401 can include DBMS performing query handling process 141 is explained with reference to FIG. 1. DBMS 1400 at block 1401 can perform bind time processing and runtime execution of a query statement. In bind time processing, DBMS 1400 can score various candidate access paths using a cost analysis and based on the cost analysis can select one of the candidate access paths. During runtime execution, DBMS 1400 can execute the query statement using the selected access path. As set forth herein, selection of an access path can be performed in dependence on a predicted query statement input variable value associated to an input variable of a query statement. DBMS 1400 can predict one or more input variable value associated to one or more input variable of a query statement during bind time processing of the query statement, and can use the predicted input variable value in the performance of cost scoring of candidate access paths. Based on the cost scoring, DBMS 1400 can select an access path from the candidate access paths for runtime execution of the query statement in dependence on the one or more predicted input variable value.

Figure 3:
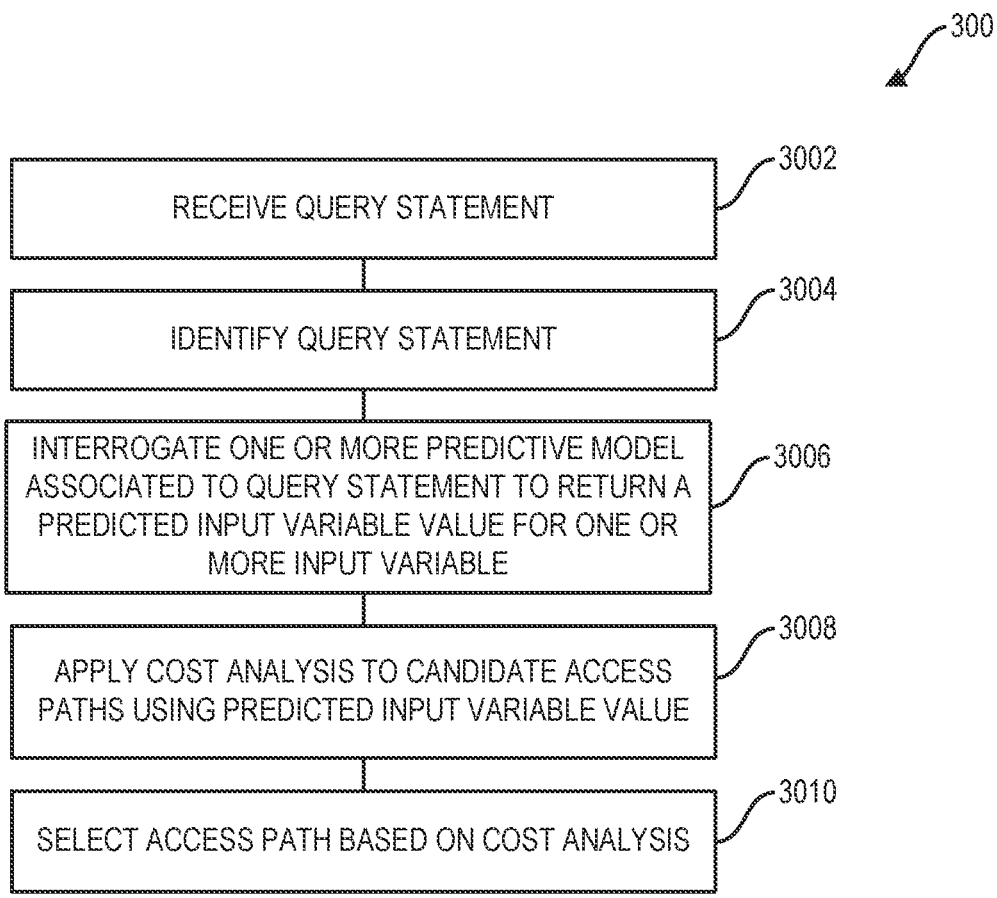
FIG. 3 is a flowchart illustrating a method for performance by a database system according to one embodiment.

FIG. 3 depicts a flowchart illustrating an example of a method 3000 by which DBMS 1400 performs bind time processing at query handling block 1401. At block 3002 of method 3000 described in FIG. 3, DBMS 1400 can receive a query statement from an enterprise system of enterprise systems 120A-120Z.

At block 3004, DBMS 1400 can identify the incoming query statement received at block 3004. According to one embodiment, data repository 138 of database system 140 can store in query statements area 3131 identifying metadata for historical query statements handled by DBMS 1400. The metadata can be arbitrarily assigned metadata assigned to each query statement and/or can be extrapolated metadata extrapolated by processing of a query statement. For identifying an incoming query statement, DBMS 1400 can perform examining of metadata of an incoming query statement. The examining can include matching metadata of an incoming query statement to metadata of query statements area 3131 that identifies historical query statements. The metadata of an incoming query statement can include assigned metadata assigned to the query statement or extrapolated metadata extrapolated by processing of a query statement. Extrapolated metadata can include scheme signature metadata returned by examination of a schema of an incoming query statement. With the identification of a query statement at block 3004, DBMS 1400 can identify one or more input variable of the query statement. DBMS 1400 identifying one or more input variable of an identified query statement can include DBMS 1400 looking up identifiers of the one or more input variable stored in query statements area 3131 of data repository 138.

On the identification of a query statement at block 3004, DBMS 1400 can proceed to block 3006. At block 3006, DBMS 1400 can interrogate one or more predictive model associated to the query statement identified at block 3004. In query statements area 3131, data repository 138 can store for each identified historical query statement data that specifies query statement attributes, including identifying data identifying input variables for the query statement and identifiers for predictive models associated to such input variables stored in models area 3132 for predicting input variable values associated to such query statements. Each respective query statement can have one to N input variables and there can be provided within system 100 a predictive model for each input variable of each respective query statement. Within data repository 138, for each respective query statement, query statements area 3131 can store data specifying input variable expressions within a query statement.

At block 3006, DBMS 1400 can interrogate one or more active predictive model associated to the query statement identified at block 3004 to return a predicted query statement input variable value for one or more input variable of the query statement. The interrogation of one or more predictive model can include use of predictive model query data that includes a context parameter value set. The context parameter value set can specify attributes of a workload associated to the received query statement received at block 3002. The context parameter value set can be extracted from a message received from an enterprise system including query statement received at block 3002 An active predictive model herein can refer to a predictive model that is generating predictions within a threshold satisfying level of accuracy. At block, DBMS 1400 can examine an active/inactive flag status for respective predictive models associated to respective input variables of an incoming query statement, and can selectively query an active predictive model for the respective query statement responsively to the determination that the flag status is active. System 100 can set the flag status for a predictive model to active responsively to determining that the predictive model is producing predictions having a threshold accuracy level.

Responsively to completion of block 3006, DBMS 1400 can proceed to block 3008. At block 3008, DBMS 1400 can perform cost scoring of multiple candidate access paths. In one aspect the performance of scoring can be dependent on a predicated input variable value. In one aspect, the scoring of multiple access paths can be dependent on filter factor which can be applied in dependence on predicted input variable value.

According to one embodiment, DBMS 1400 for performing cost scoring associated with each of several candidate access paths can score the total cost associated to each access path. According to one scoring method that can be applied, DBMS 1400 for assigning a total cost value to a candidate access path can assign a CPU cost factor and an I/O cost factor. Subcomponents of a CPU cost factor can include, e.g., base cost, page cost, scan cost, and row cost. According to a cost mapping decision data structure stored in decision data structures area 3134, an assigned filter factor for a query statement expression assigned based on a predicted input variable value can be used to estimate a number of rows to be accessed, which estimate can impact base cost, page cost, scan cost, row cost, and therefore, CPU cost and I/O cost. Accordingly, the assigned filter factor for a query statement expression can impact a total cost assigned for cost scoring of a candidate access path.

A predicate in SQL refers to true/false condition such as in a WHERE clause, or a HAVING clause. SQL predicates can be found on the tail end of clauses, functions, and SQL expressions in existing query statements. In one aspect a predicate can refer to an expression that evaluates to TRUE, FALSE, or UNKNOWN. Predicates can be used, e.g., in the search condition of WHERE clauses and HAVING clauses, the join conditions of FROM clauses, and other constructs where a Boolean value is required.

The filter factor of a predicate can refer to a number between 0.0 and 1.0 which estimates the proportion of rows in a table for which the predicate is true. Those rows are said to qualify by that predicate. For example, suppose that a database system can determine that column C1 of table T of database 136 contains only one of five distinct values: A, B, C, D, E. In the absence of other information, the database system can estimate that one-fifth of the rows contain any one of the possible values A, B, C, D or E in column C1. Accordingly, in the described scenario, DBMS 1400 using default input variable to filter factor mapping data stored in decision data structures area 3134 can assign for the predicate C1='X' for table T the filter factor 0.2.

For further illustration, a query statement for processing can take the form as shown in Table B.

TABLE B

SELECT C4 FROM T1
WHERE C1 = 'Z'
INDEX I1: C1, C2, C3
T1 CARDF = 100,000
C1 COLCARF = 5
I1 NLEAF = 10,000
I1 NLEVELS = 3

Where "X" is unknown and can assume the values A, B, C, D, or E. In the described scenario, where 'X' is unknown, DBMS 1400 using a default input variable to filter factor mapping decision data structure stored in decision data structures area 3134 can assign the filter factor of 0.2 for the predicate having the unknown variable 'X', C1='X'. The described default input variable to filter factor mapping decision data structure stored in decision data structures area 3134 can store the following association: Assign the filter factor 0.2 for any value of C1, where C1='X'. Embodiments herein recognize however, that filter factors can be more accurately assigned where values of input variables can be accurately predicted.

In one embodiment, database system 140 can determine by examination of column C1 of table T within database 136 in the scenario described, that filter factors can be assigned for the various distinct possible input variable values of C1='X' in accordance with the distinct input variable value to filter factor mapping data defined by the decision data structure of table C, for storage into decision data structures area 3134.

TABLE C

| C1 | Filter Factor |
|---|---|
| 'A' | 0.75 |
| 'B' | 0.15 |
| 'C' | 0.05 |
| 'D' | 0.03 |
| 'E' | 0.02 |

Database system 140 can be configured to iteratively, e.g., on a periodic basis, examine tables of database 136 that are referenced by input variables in order to iteratively update a distinct input variable value filter factor mapping data structure as shown in table C for respective input variables being handled by database system 140. Referring to Table C, DBMS 1400 using the distinct input variable value to filter factor mapping data decision data structure of table C can assign a filter factor of 0.75 in the case that C1='A', can assign a filter factor of 0.15 in the case that C1='B', can assign a filter factor of 0.05 in the case that C1='C', can assign a filter factor of 0.03 in the case that C1='D', and can assign a filter factor of 0.02 in the case that C1='E'.

DBMS 1400 can assign filter factors in dependence on predicted input variable value as explained with reference to table C, use the assigned filter factors to estimate the number of returned dataset rows of a referenced table, and can apply the estimated number of rows returned in the performance of candidate access path scoring.

DBMS 1400 according to one embodiment at block 3008, responsively to predicting one or more input variable value of a query statement at block 3006 can apply one or more distinct input variable value filter factor determined using a decision data structure featured according to table C, rather than using an unknown input variable value to default filter factor mapping decision data structure described in reference to table B (e.g., filter factor of 0.2 applied for the unknown variable C1='X'). Embodiments herein recognize that use of a distinct input variable value to filter factor mapping decision data structure as explained with reference to table C can improve the selection of an access path so that a selected access path has improved performance relative an access path selected without use of a distinct input variable value to filter factor mapping decision data structure.

According to one embodiment, database system 140 can perform cost scoring of candidate access paths in dependence on a detected table trend characteristic of a table associated to an input variable. A table associated to an input variable can refer to a table from which a dataset defined by accessed table rows is returned in response to execution of a query statement expression having the input variable.

At block 3008, DBMS 1400 can determine one or more table trend classification of a table accessed by execution of a query statement in dependence on a predicted query statement input variable value returned at block 3006. At block 3008, DBMS 1400 can examine a predicted returned dataset returned from a certain table associated to an input variable value using a predicted input variable value returned at block 3006 and can compare resulting returned dataset to historical returned datasets for the certain table referenced within logging area 3133 as to prior timeslots. At block 3008 DBMS 1400 can examine table metrics logging data of logging area 3133 to determine table trend classifications of tables referenced by an incoming query statement being processed and can use the table trend classification in the performance of candidate access path cost scoring and access path selection. Logging data stored in logging area 3133 of data repository 138 can include table metrics logging data that specifies historical table identifiers and historical ranges of table rows that have been returned in response to execution of a query statements having one or more input variable.

Based on the predicted returned dataset returned using a predicted input variable value, DBMS 1400 can classify a table referenced by execution of a query statement expression as having a certain one or more trend classification. DBMS 1400 can then perform cost scoring of candidate access paths in dependence on the predicted input variable value and in dependence on the determined table trend classification.

Possible table trend classifications can include, e.g., filter factor stable, filter factor changing, returned dataset stable, returned dataset changing, returned dataset size stable, returned dataset size changing. A query statement expression having an input variable when executed can result in a returned dataset defined by table rows (records) returned from a referenced table associated to the query statement. As explained with reference to FIG. 4, embodiments herein can use time series data of returned datasets 4004 and referenced tables 4002 associated to such returned datasets in the performing access path selecting based on a predicted input variable value. Returned datasets 4004 depicted FIG. 4 can refer to rows of table data returned from an associated table 4002 by performance of a query statement expression that includes an input variable.

Figure 4:
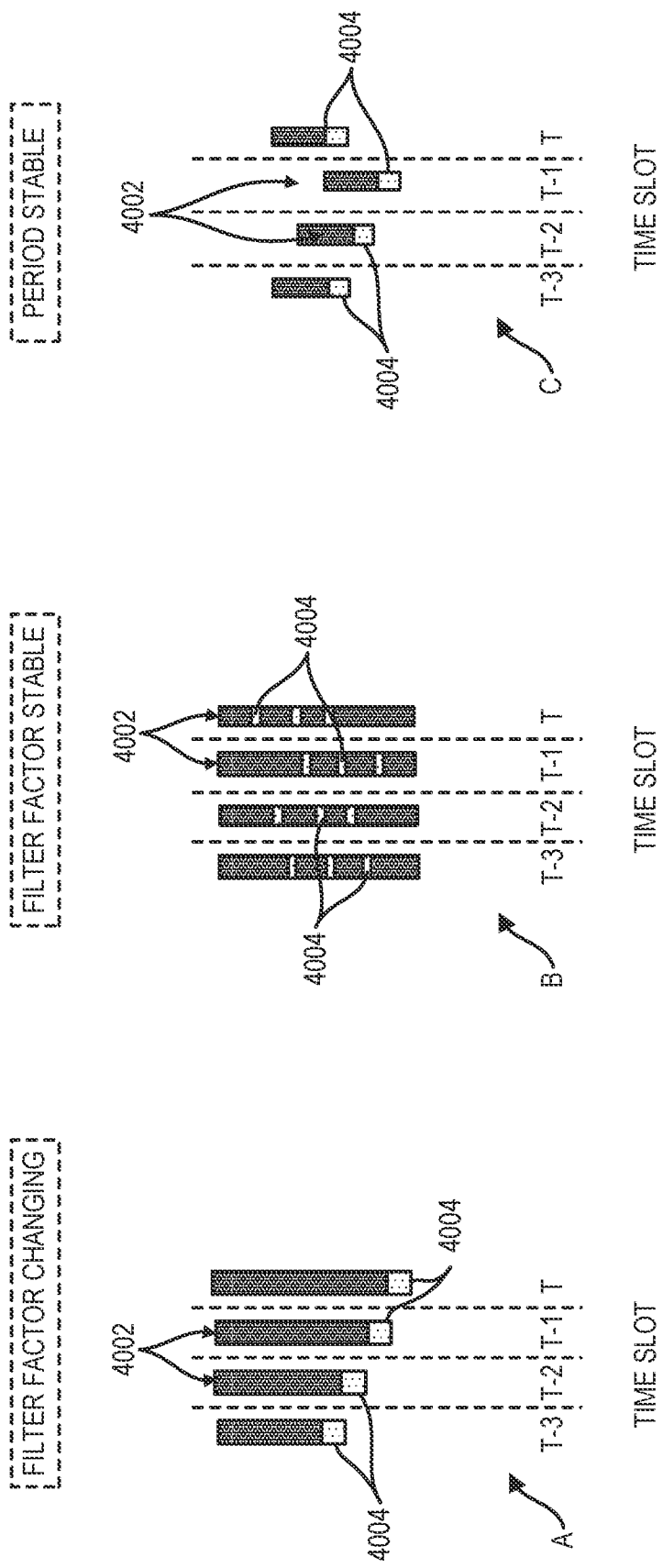
FIG. 4 depicts example trends that can be exhibited by a database table in response to multiple iterations of processing of a query statement according to one embodiment.

Referring to FIG. 4, trends such as table trends A, B, and C can be identified with respect to different tables referenced by different example query statement expressions that include respective input variables. Between times t=T-3 and time t=T the table row size of the table 4002 depicted in trend A can be increasing and the returned dataset 4004 can be stable, i.e., the same dataset 4004 (for the same specified timestamp range) can be returned for each timeslot. In the scenario depicted with the trend label A, DBMS 1400 can classify the referenced table 4002 of the query statement expression associated to trend A as having a stable returned dataset and a changing (specifically decreasing) fill factor.

In the scenario depicted with the trend label B of FIG. 4, table size of a referenced table 4002 can remain constant through advancing timeslots, and the size of returned datasets 4004 for each timeslot can remain consistent throughout the different timeslots. In such a scenario, DBMS 1400 can classify the referenced table 4002 as having a stable sized returned dataset 4004 and a stable filter factor as well as a changing returned dataset.

In the scenario depicted with the trend label C, DBMS 1400 can classify the referenced table 4002 as having a stable period, as well as stable filter factor, stable returned dataset size, and a changing returned dataset 4004. Trend C can arise, e.g., where database system 140 can automatically reduce a row size of a table 4002 on a periodic, e.g., daily basis. Trend C can be common in banking applications, for example, where transaction data may be made available only for a predetermined time period, e.g., the last month. In such a scenario, DBMS 1400 can remove one table row from a table each advancing day.

In each of the described trends A, B, and C depicted in FIG. 4, the timeslot T can refer to a next period timeslot associated to a predicted dataset return by DBMS 1400 predicted using a predicted query statement input variable value returned at block 3006. The timeslot T-1 can refer to the timeslot of the most recent execution of the current query statement for which logging data in present in logging area 3133 of data repository 138. The timeslots T-2 and T-3 can refer to the timeslots of next prior executions of the current query statement for which logging data in present in logging area 3133 of data repository 138. At block 3008 DBMS 1400 can examine table metrics logging data of logging area 3133 to determine table trend classifications of tables referenced by an incoming query statement being processed and can use the table trend classification in the performance of candidate access path cost scoring and access path selection.

In the performance of cost scoring for candidate access paths as explained in reference to table C, DBMS 1400 can apply a filter factor in dependence on predicted input variable value which filter factor can be used to estimate the number of returns rows of a referenced table, which estimated number of dataset rows can be used in the performance of candidate access path scoring. In one embodiment, where the number of rows returned can be predicted using a table trend classification based on the predicted input variable value as explained with reference to FIG. 4, DBMS 1400 can use the predicted number of rows returned from a table as an input into access path scoring directly, without specification of filter factor for transformation into a returned row estimate.

Table D illustrates a decision data structure that can be used for return of action decision to establish a candidate access path cost scoring method in dependence on a determined table trend classification.

TABLE D

| Row | Condition 1 | Condition 2 | Condition 3 | Action Decision |
| --- | --- | --- | --- | --- |
| 1 | Changing filter factor | Stable returned dataset size | Stable returned dataset | Use predicted number of rows directly as an input into candidate access path cost scoring without determination of filter factor. |
| 2 | Stable filter factor | Stable returned dataset size | Changing returned dataset | Determine filter factor using distinct input variable value to filter factor mapping as explained with reference to table C as an input into candidate access path cost scoring. |

Referring to FIG. 4 and Table D, the conditions of Row 1 resulting in application of an access path cost scoring method including predicting a number of returned rows (as opposed to estimating the number of returned dataset rows using filter factor) can apply in the case that trend A is detected and table trend classifications associated to trend A are applied, and the conditions of Row 2 resulting in application of an access path cost scoring method including use of filter factor can apply in the case that trend B or C as explained in FIG. 4 is detected and the table trend classifications associated to trend B or C are applied.

In response to performing cost scoring of candidate access paths at block 3008 as set forth herein, DBMS 1400 can proceed to block 3010 to select an access path for performance of runtime execution of the incoming query statement being processed. At block 3010, DBMS 1400 can select the candidate access path having the lowest cost score according to the cost scoring performed at block 3008 as the access path for performance of runtime execution of the incoming query statement being processed.

Responsively to performance of cost scoring of candidate access paths at block 3008 and selection of an access path at block 3010 for use in runtime execution of a query statement, DBMS 1400 can proceed to perform runtime execution of the current query statement. During runtime execution of a query statement, DBMS 1400 can execute the received query statement being processed using the selected access path selected at block 3010 selected in dependence on one or more predicted query statement input variable value associated to one or more input variables of a query statement.

On completion of execution of a query statement which can conclude block 1401, DBMS 1400 can proceed to block 1402. At block 1402, DBMS 1400 can perform a logging operation to collect logging data respecting a just processed query statement. Logging data for a query statement can include listings of input variables of a query statement associated with determined and returned input variable values determined and returned by DBMS 1400 during runtime execution of the query statement. Logging data can also include table metrics logging data that specifies table identifiers and ranges of table rows that have been returned in response to execution of a query statements having one or more input variable. DBMS 1400 during iterations of block 1401 and block 3008 can examine the described table metrics data for determination of table classifications at block 3008. At block 1402 DBMS 1400 can store collected logging data into logging area 3133 of DBMS 1400.

At block 1402, DBMS 1400 can send logging data to manager system 110 for receipt by manager system 110 for use in performance of machine learning processing. The sending of logging data at block 1402 can be performed, e.g., at the completion of runtime execution of each respective query statement or, in one embodiment, at periodic timed intervals. In response to the receipt of the logging data sent at block 1402, manager system 110 at block 1101 can perform training of one or more machine learning model using the input variable value logging data sent at block 1402.

Manager system 110 at block 1101 can train a plurality of predictive models using mapping logging data that maps query statement input variables to determined input variable values determined during runtime execution of a query statement. According to one embodiment, system 100 can provide a predictive model for each query statement expression of a query statement that includes an input variable for which an input variable value is returned on execution of the query statement expression. Manager system 110 can be running machine learning process 111. At training block 1101, manager system 110 can be applying training data to predictive model 5002 as depicted in FIG. 5.

Training data for training predictive model 5002 can include iterations of (a) a context parameter and (b) determined input variable value time series data. Iterations of training data can be obtained from the logging data sent at block 1402 by database system 140 and received by manager system 110. Iterations of training data can include, in addition or alternatively, logging data sent by an additional one or more database system configured according to database system 140 and received by manager system 110. The context parameter value set (a) can be obtained from message data including transaction query data sent by enterprise systems 120A-120Z at block 1201. Embodiments herein recognize that messages including query statements can include context data that can indicate the workload and particular enterprise system of enterprise systems 120A-120Z sending transaction query data at block 1201.

Embodiments herein also recognize that query statements associated to one particular workload and enterprise system can be more likely to exhibit a predictable pattern than query statements from a plurality of different enterprise systems 120A-120Z. Accordingly, embodiments herein can include training predictive model 5002 using a context parameter value set so that predictive model 5002 can learn workload trends that are dependent on content data that indicates a workload and enterprise system associated to a determined time series data.

A context parameter value set can include a set of parameter values extracted by DBMS 1400 from message data that includes query statements received from enterprise systems 120A-120Z. Parameter values for use in a context parameter value set can include one or more of, e.g., Accounting Information, Collection Name, Connection Type, Correlation Information, LU Name, Net ID, Package Name, Perform, Plan Name, Priority, Procedure Name, Process Name, Scheduling Environment, Subsystem Collection Name, Subsystem Instance, Subsystem Parameter, Sysplex Name, System Name, Transaction Class/Job Class, Transaction Name/Job Name, and/or Userid.

Predictive model 5002, once trained, is able to respond to query data. Query data for querying predictive model 5002 can include a context parameter value set specifying attributes of a current workload associated to a received incoming query statement subject to processing at block 1401 (FIG. 2) and by process 300 as explained in reference to FIG. 3. A trained predictive model 5002 can be queried at various times during the operation of database system 140, for example, at block 1401 when a query statement is being processed and also when predictive model 5002 is being tested for determining whether predictive model 5002 is producing predictions having a threshold satisfying level of accuracy.

Various machine teaming modeling techniques can be used to provision of predictive model that predicts next input variable values in dependence on a history of input variable values. Machine learning modeling methods that can be applied can include e.g., Fourier transform analysis curve fitting, neural networks, support vector machines, linear regression, and the like. Machine learning methodologies can be combined, e.g., according to one example, a deep Fourier neural network can be used to curve fit time series data. Embodiments herein recognize that time series input variable values can exhibit periodic patterns which can be subject to modelling by various curve fitting methodologies including Fourier transform machine learning methods. A Fourier transform machine teaming method can be used to fit a curve to time series data based on Fourier transform principles.

For applying Fourier transform based machine learning methods for curve fitting of time series data provided by input variable values for executed query statements over time, manager system 110 can use discrete Fourier transform analysis to separate different character sequences. Referring to FIG. 6, discrete Fourier transform analysis performed on input time series training data 6002 provided by a sequence of runtime execution determined input variable values over time, can provide component frequency signals 6004, 6006, 6008. A frequency domain representation 6010 of the input time series can indicate peaks at the component frequencies. Once the component frequencies are determined random forest machine learning processes can be used to determine weights for the various component frequencies.

Embodiments herein recognize that time series data defined by a succession of input variable values over time may in some instances not be persistently periodic but rather can exhibit periodicity only during select time periods and at other time periods can exhibit aperiodic, e.g., random behavior. Some time series input variable values can exhibit periodic behavior followed by aperiodic behavior. That is, for a first set of timeslots, time series input variable values can exhibit a periodic pattern and in a successive set of timeslots, the input variable values can exhibit an aperiodic pattern. Embodiments herein recognize that an accuracy with which an input variable value associated to an input variable expressed in a time series can be dependent on a level of periodicity of the input variable time series.

Figure 7:
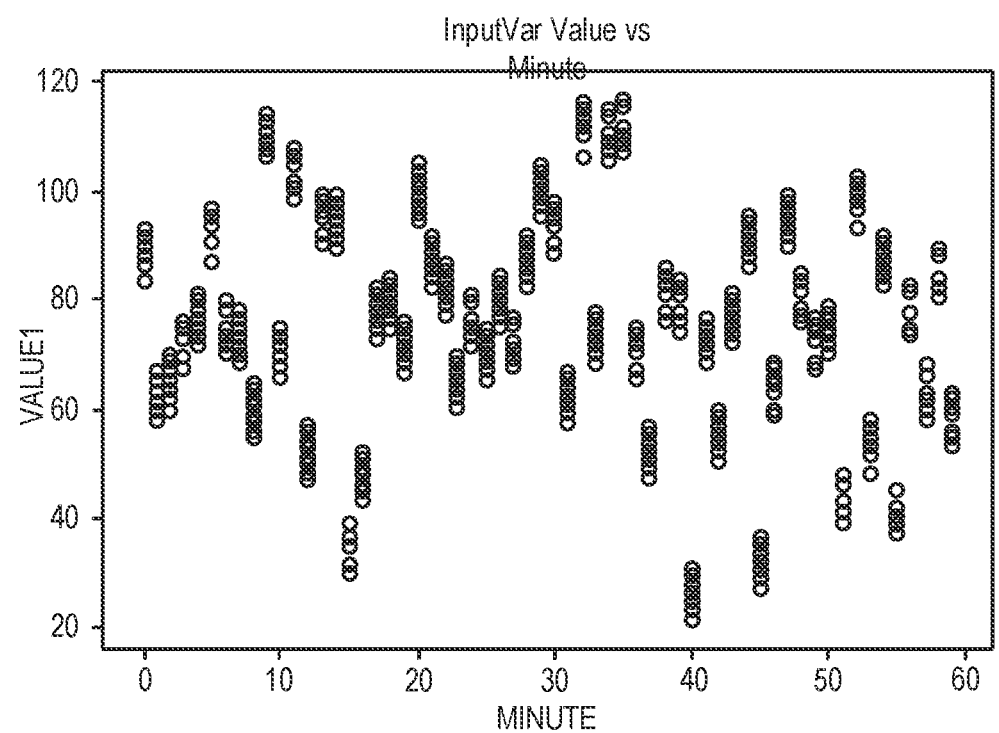
FIG. 7 depicts an example of time series defined by runtime determined input variable values over successive runtime executions of a query statement.
Figure 8:
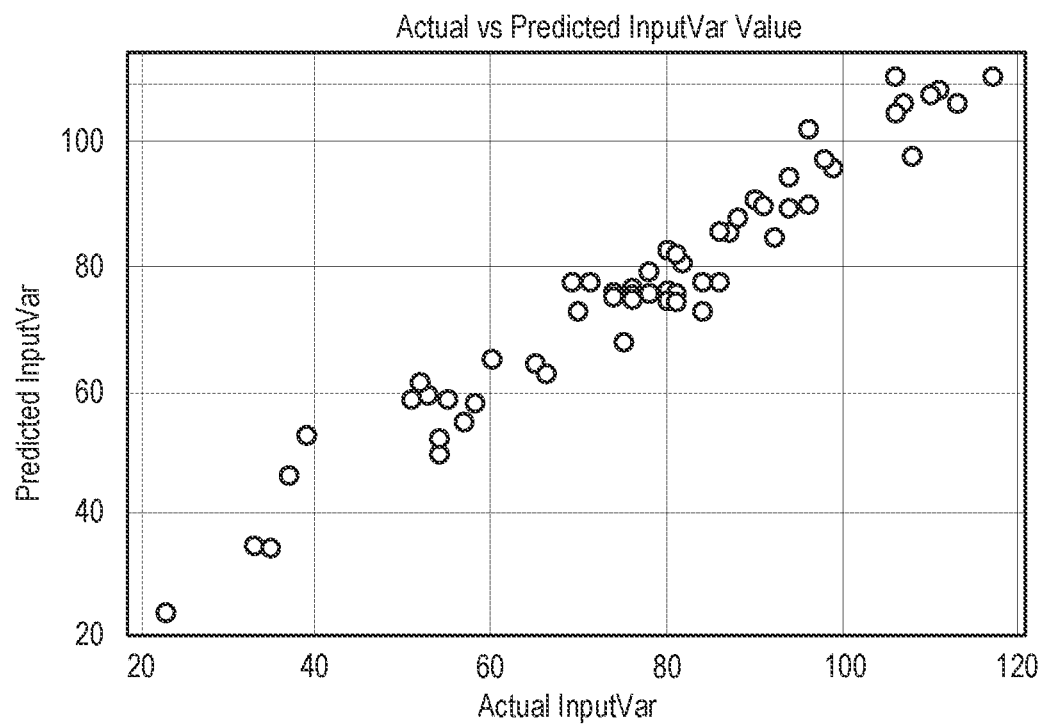
FIG. 8 depicts comparison data illustrating output predictions of a predictive model trained to predict input variable values of a query statement input variable, as compared to ground truth data defined by holdout data according to one embodiment.

Referring to FIGS. 7 and 8, data plots are shown. In FIG. 7, there is depicted a time series of input variable values over time exhibiting a periodic pattern and in FIG. 8, there is shown a plot indicating the accuracy of a prediction for the time series data of FIG. 7 using a predictive model. Embodiments herein recognize that because time series data for input variable values for a certain input variable of a query statement can be selectively periodic rather than persistently periodic input variable values may not at all times be predictable within a threshold satisfying level of accuracy, but rather may be predictable within a threshold satisfying level of accuracy in select time slots of a deployment period.

Manager system 110, according to one embodiment, can be configured to iteratively test each instance of predictive model 5002 that is being subject to training over time to iteratively ascertain whether that predictive model is producing predictions according to a threshold satisfying level of accuracy. At testing block 1102, manager system 110 can test one or more predictive model that is configured for predicting an input variable value associated to an input variable of a query statement.

For performing testing at testing block 1102, manager system 110 can compare (a) predicted input variable values output by one or more predictive model in response to an interrogation to (b) ground truth data defined by holdout data of logging data that is used for training and testing the one or more predictive model. At testing block 1102, manager system 110 can appropriately set an active/inactive status flag for each respective predictive model being trained that indicates whether the predictive model is currently producing predictions with a threshold satisfying level of accuracy.

Various methods can be used to determine whether predictive model is outputting a prediction within a threshold satisfying level of accuracy. For example, manager system 110 at testing block 1102 can apply one or more time series model quality measure for comparing a predicted value output by a trained predictive model to ground truth data defined by holdout data. Applied measurements for comparing predicted values to ground truth data can include, e.g., mean square error (MSE), mean absolute percentage error (MAPE), and/or root mean square error (RMSE). There is set forth herein, according to one embodiment, receiving an incoming query statement, wherein the incoming query statement comprises a query statement expression that includes an input variable; predicting an input variable value associated to the input variable; selecting an access path for runtime execution of the query statement in dependence on the predicted input variable value; and performing runtime execution of the query statement using the selected access path, wherein the predicting the input variable value associated to the input variable includes interrogating a predictive model for return of the predicted input variable value, wherein the predictive model has been trained with training data that includes historical input variable values determined for the input variable, wherein the method includes determining whether the predictive model is returning predictions according to a threshold satisfying level of accuracy, wherein the method includes performing the interrogating the predictive model responsively to a determining that the predictive model is returning predictions according to the threshold satisfying level of accuracy, and wherein the determining whether the predictive model is returning predictions according to a threshold satisfying level of accuracy includes comparing forecasts returned using the predictive model to ground truth data defined by holdout data of the training data that includes historical input variable values.

Manager system 110 at action decision block 1103 can return an action decision to set an active/inactive status flag for one or more trained predictive model and to push one or more trained predictive model to database system 140 for use by DBMS 1400 for return of predictions as to input variable values in the performance of query handling. At action decision block 1103, manager system 110 can set a status flag for a predictive model to active when testing the predictive model indicates that the model is producing predictions with a threshold satisfying level of accuracy and can set the status flag to inactive when testing of a predictive model at block 1102 indicates that the predictive model is not producing predictions within a threshold satisfying level of accuracy.

At action decision block 1103, manager system 110 can return an action decision to push an instance of predictive model 5002 to database system 140 on the condition that the predictive model is currently active as can be determined by reading its status flag and can return an action decision at block 1103 to refrain from pushing a trained predictive model to database system 140 on the condition that the predictive model is inactive as can be determined by reading the status flag. The selective pushing of trained predictive models can improve computer system performance. Pushing trained predictive models to DBMS 1400 can improve data acquisition time for return of predicted input variable values. Pushing trained models selectively can reduce storage resource utilization.

On completion of action decision block 1103, manager system 110 can proceed to block 1104. At block 1104, manager system 110 can send model data defining one or more trained active model to database system 140 for storage in models area 3132 of data repository 138 of DBMS 1400. With the model data sent at block 1104, manager system 110 can send status data for each instance of predictive model 5002 being trained by manager system 110 at block 1101 whether active (producing predictions with threshold satisfying accuracy) or inactive (not producing predictions with threshold satisfying accuracy).

Thus, on receipt of the status data sent at block 1104, DBMS 1400 has comprehensive information on the status of all predictive models being trained by manager system 110 indicating whether the predictive model is active (producing predictions according to a threshold satisfying level of accuracy) or inactive (not producing predictions according to a threshold satisfying level of accuracy). On receipt of the model and status data sent at block 1403, DBMS 1400 at block 1403 can update models area 3132 of data repository 138 so that active/inactive status associated to all predictive models of models area 3132 are updated, and so that models area 3132 includes for each active predictive model of models area 3132 the most recently updated version of the active model trained at the most recent iteration of training block 1101 and pushed to DBMS 1400 at the most recent iteration of send block 1104.

Returning to block 3006 of the flowchart of FIG. 3, DBMS 1400 at block 3006 can examine the active/inactive flag status indicators for each input variable of a query statement received at block 3002 to determine whether the predictive model is active or inactive. In the case that the predictive model is active, DBMS 1400 at block 3006 can interrogate the active predictive model to return a prediction as to an input variable value associated to an input variable of a query statement expression and then can proceed to blocks 3008 to use the returned predicted input variable value in the return of a selected access path from a plurality of candidate access paths subject to cost analysis.

If, however, DBMS 1400 at block 3006 examines an active/inactive flag status indicator and determines that a certain predictive model associated to a certain input variable of a query statement is inactive, DBMS 1400 can, for that certain input variable, perform a default operation. According to default operation, DBMS 1400 can apply a default filter factor values using an unknown input variable value to default filter factor mapping decision data structure described in reference to table B without alteration of any assigned filter factor values using processes as described in connection with the distinct input variable value to filter factor mapping decision data structure of table C.

According to the described operation, DBMS 1400 can interrogate predictive models associated to input variables of a query statement only selectively and accordingly can selectively modify access path selection in dependence on predicted input variable values selectively on the condition that time series data specifying input variable values over time for a particular input variable is determined to be sufficiently predictable and satisfying threshold accuracy level.

According to the described scenario, it can be seen that a certain query statement can include first and second input variables. In one example, first and second predictive models can be established to return predicted input variable values for the first and second input variables of the query statement. According to one scenario, testing of the first predictive model at testing block 1102 can indicate that the predictive model for the first input variable is successfully returning predictions according to a threshold satisfying level of accuracy while testing of a second predictive model at testing block 1102 by manager system 110 can indicate that the second predictive model is not producing predictions for input variable values according to a threshold satisfying level of accuracy. In the described scenario, the first predictive model can be labeled active by manager system 110 at action decision block 1103 and the second predictive model can be labeled inactive by manager system 110 at action decision block 1103. At block 1104, manager system 110, in the described scenario, can push model data defined by a trained predictive model trained with most recently available training data for the first predictive model and status flag indicators for each of the first and second predictive models. The flag status indicator for the first predictive model can indicate that the first predictive model is active and the flag status indicator for the second predictive model can indicate that the second predictive model is inactive.

On query handling at block 1401 of the query statement, DBMS 1400 at block 3006 can examine the active/inactive status indicator and can determine that the first predictive model is active and the second predictive model is inactive. In the described scenario, DBMS 1400 in handling the query statement having the first input variable and the second input variable can query a first predictive model for return of predicted input variable values for the first input variable and for the second input variable (because the second predictive model is inactive) can avoid querying any predictive model for return of a prediction as to an input variable value. In the described scenario, default operation proceeds for the second input variable and DBMS 1400 does not adjust filter factor values assigned in dependence on the query statement expression having the second input variable. For the second input variable, DBMS 1400 can determine an assigned filter factor using an unknown input variable value to default filter factor mapping decision data structure described in reference to table B, However, for the query statement expression that includes the first input variable that is currently sufficiently predictable, DBMS 1400 can adjust assigned filter factor values in the manner described in connection with tables C and D and the flowchart of FIG. 3. For the query statement expression that includes the first input variable that is currently sufficiently predictable, DBMS 1400 can assign filter factor values using a distinct input variable value to filter factor mapping data structure as described in connection with table C. There is set forth herein a method comprising receiving an incoming query statement, wherein the incoming query statement comprises a query statement expression that includes an input variable; predicting an input variable value associated to the input variable; selecting an access path for runtime execution of the query statement in dependence on the predicted input variable value; and performing runtime execution of the query statement using the selected access path, wherein the predicting the input variable value associated to the input variable includes interrogating a predictive model for return of the predicted input variable value, wherein the predictive model has been trained with training data that includes historical input variable values determined for the input variable, wherein the query statement includes a second query statement expression having a second input variable, and wherein there is associated to the second input variable of the query statement a second predictive model that has been trained with training data that includes historical input variable values determined for the second input variable, wherein the method includes determining whether the predictive model is returning predictions according to a threshold satisfying level of accuracy, and determining whether the second predictive model is returning predictions according to a prediction threshold satisfying level of accuracy, wherein the method includes performing the interrogating the predictive model responsively to a determining that the predictive model is returning predictions according to the threshold satisfying level of accuracy, and wherein the method includes assigning a default filter factor for the second input variable without return of a prediction for a second input variable value for the second input variable responsively to a determining that the second predictive model is failing to return predictions according to the prediction threshold satisfying level of accuracy, and wherein the selecting the access path for runtime execution of the query statement in dependence on the predicted input variable value includes selecting the access path for runtime execution of the query statement in dependence on the predicted input variable value and in dependence on the default filter factor.

Certain embodiments herein may offer various technical computing advantages and practical applications involving computing advantages to address problems arising in the realm of computer systems. Embodiments herein include a computer system defined by a database that has improved performance. According to one aspect, query statement input variable values can be predicted using a predictive model trained by machine learning. Returned predictions can be used to adjust assigned filter factors and the adjusted filter factors can be used for access path cost analysis scoring and access path selection. Returned predictions can be used to classify a table trend for a table associated to the input variable and the classified table trend can be used for access path cost analysis scoring and access path selection. According to one embodiment, access path selection can be performed in dependence on predicted query statement input variable values that are returned by interrogation of trained predictive models that predict an input variable value associated to an input variable of a query statement. According to one embodiment, trained predictive models that predict input variable values associated to input variables can be iteratively subject to testing to determine a level of accuracy of predictions returned with use of the predictive models. According to one embodiment, a status flag can be associated to each predictive model that indicates the active/inactive status of the predictive model. A status flag associated to a predictive model can be active when the predictive model returns predictions according to a threshold satisfying level of accuracy and the flag status can be set to inactive when the predictive model is returning predictions that do not exhibit a threshold satisfying level of accuracy. In the handling of a query statement input variable, a database management system can selectively interrogate a predictive model that returns a prediction for an input variable value associated to the input variable in dependence on whether the predictive model is inactive or active. A database management system can perform access path selection in dependence on a predicted input variable value selectively on the condition that the input variable value is determined to be currently predictable within a threshold satisfying level of accuracy.

Figure 9:
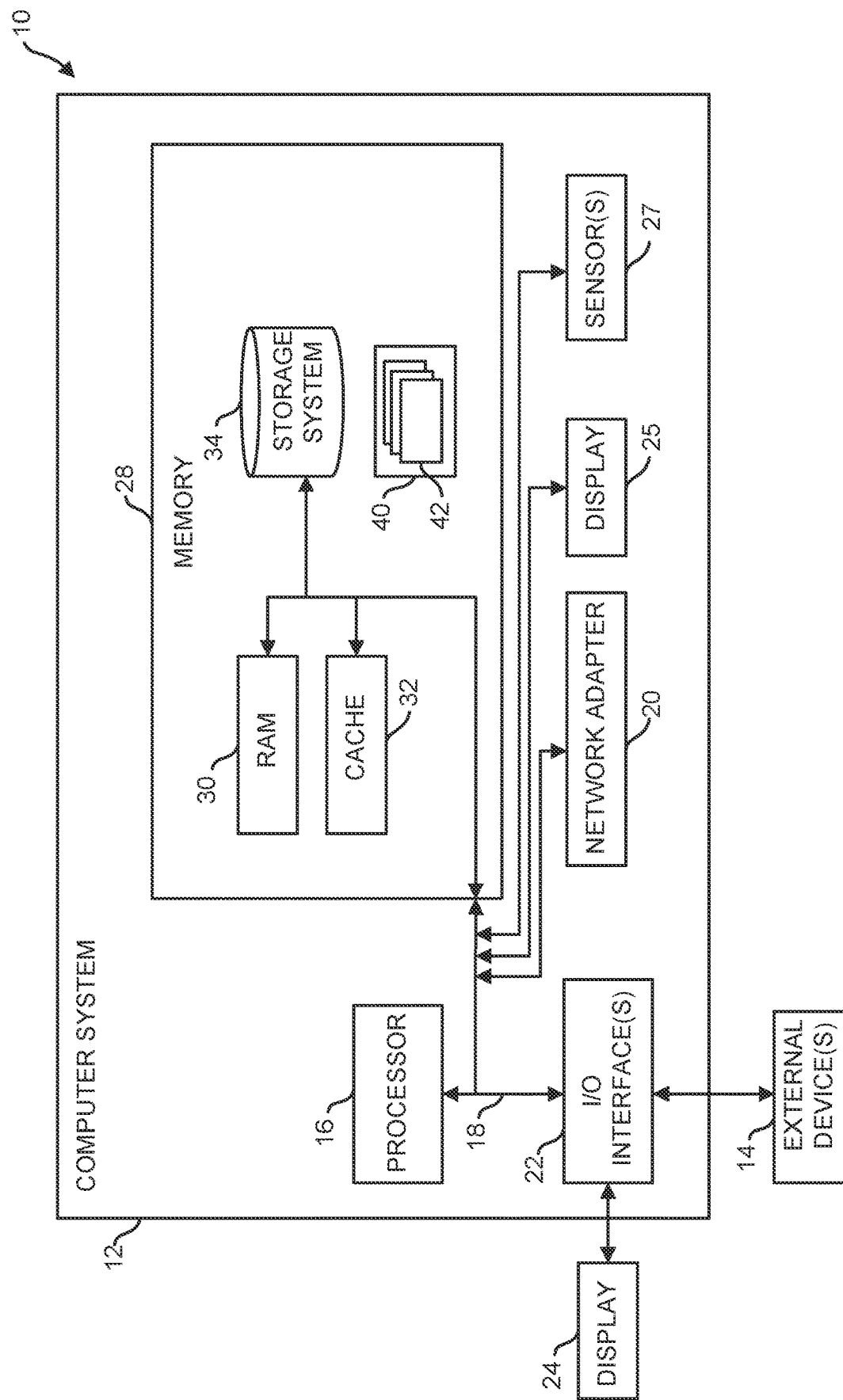
FIG. 9 depicts a computing node according to one embodiment.
Figure 10:
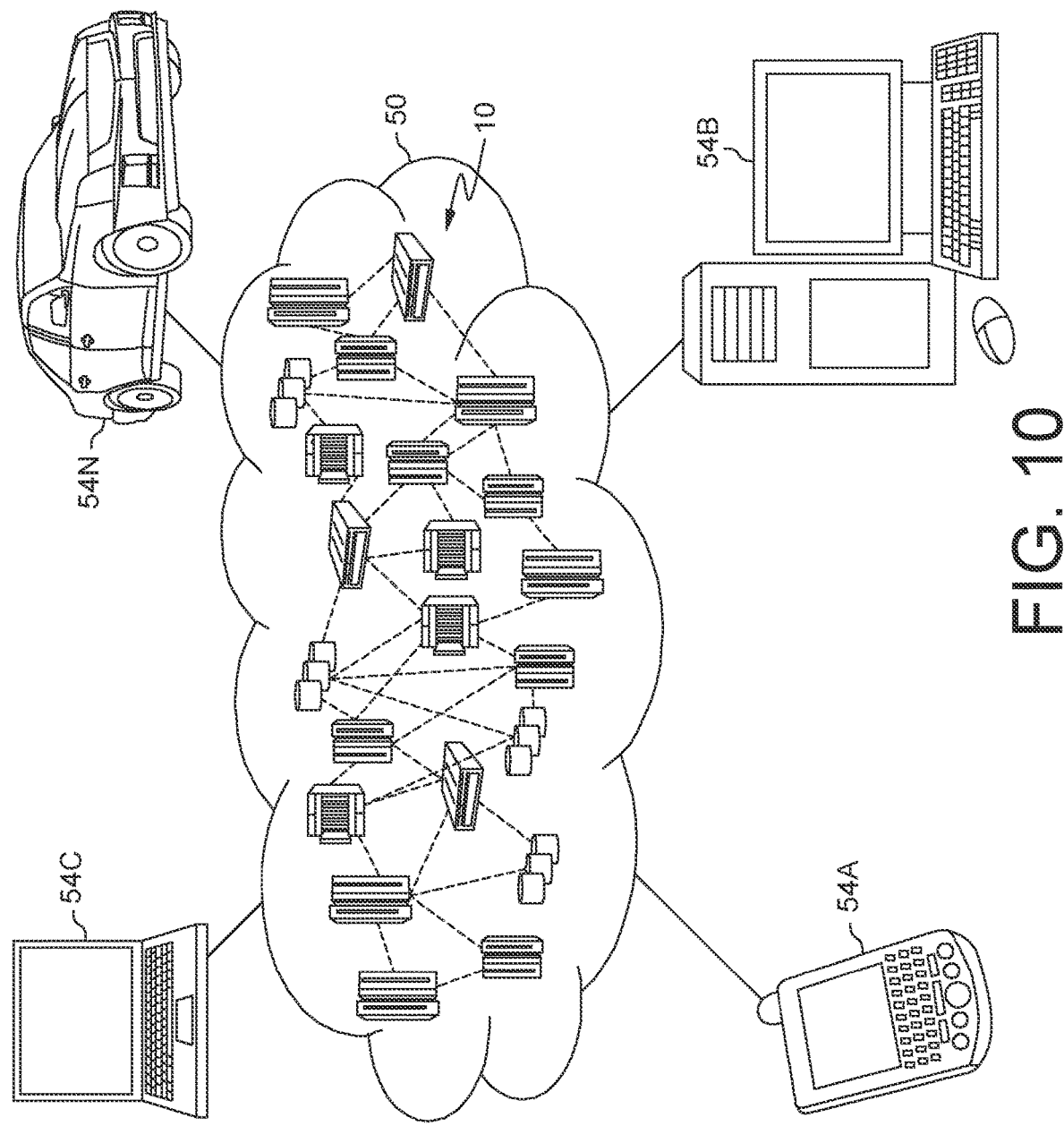
FIG. 10 depicts a cloud computing environment according to one embodiment.
Figure 11:
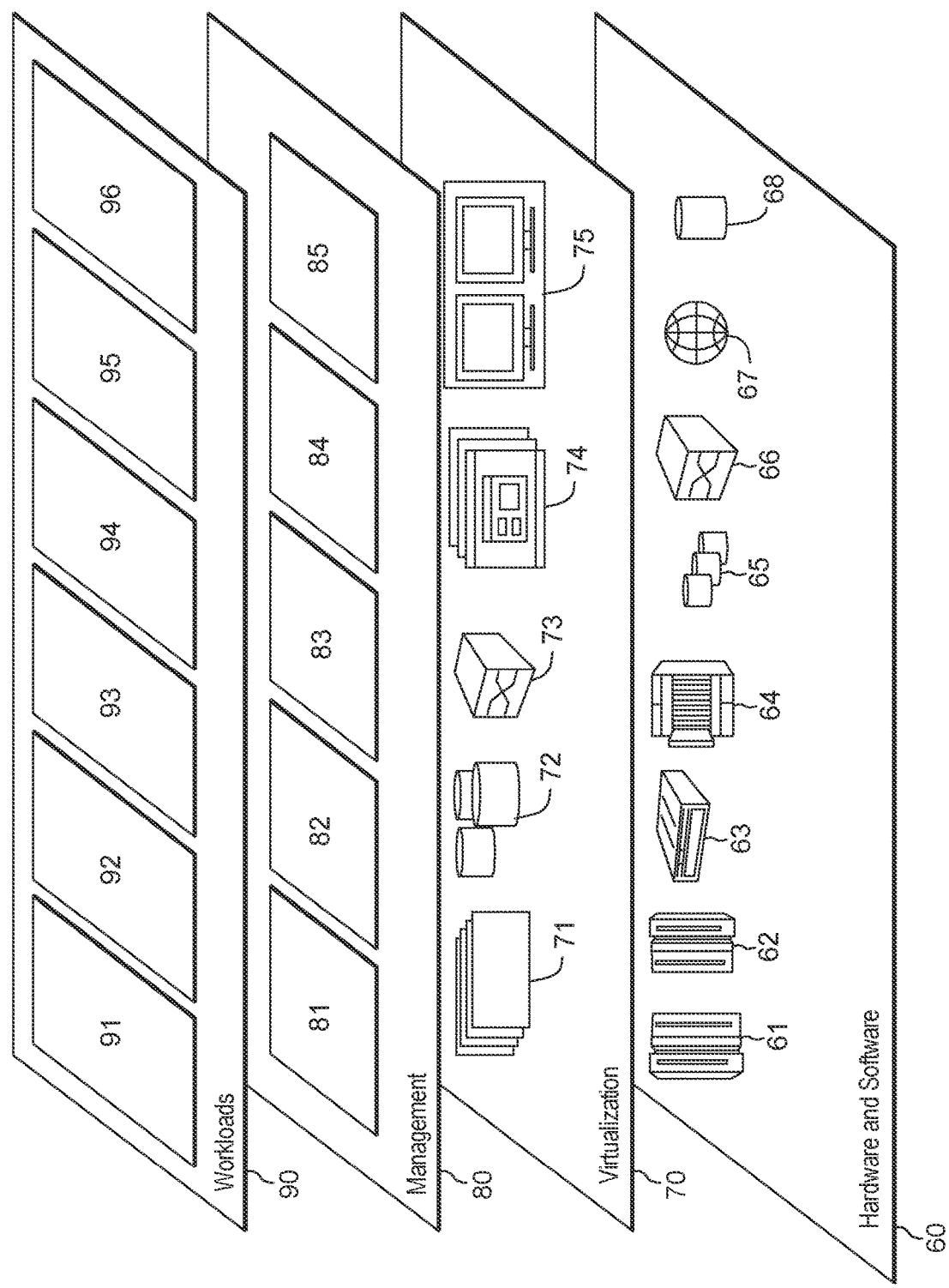
FIG. 11 depicts abstraction model layers according to one embodiment.

FIGS. 9-11 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 9, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 8-9.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, database system 140 can include one or more computing node 10 and can include one or more program 40 for performing functions described with reference to method 300 of FIG. 3 and functions described with reference to database system 140 as set forth in the flowchart of FIG. 4. In one embodiment, manager system 110 can include one or more computing node 10 and can include one or more program 40 for performing functions described with reference to functions described with reference to manager system 110 as set forth in the flowchart of FIG. 2. In one embodiment, one or more client UE device 120A-120Z can include one or more computing node 10 and can include one or more program 40 for performing functions described with reference to one or more UE device 120A-120Z as set forth in the flowchart of FIG. 2. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20.

As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 10 computing node 10 is described as being implemented in a cloud computing environment and accordingly is referred to as a cloud computing node in the context of FIG. 10.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof This allows cloud computing environment 50 to offer infrastructure, platforms and/or software as services for which a cloud consumer does not need to maintain resources on a local computing device. It is understood that the types of computing devices 54A- N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for predicting input variables and access path selection as set forth herein. The processing components 96 can be implemented with use of one or more program 40 described in FIG. 9.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   receiving an incoming query statement, wherein the incoming query statement comprises a query statement expression that includes an input variable;
   predicting an input variable value associated to the input variable;
   selecting an access path for runtime execution of the query statement in dependence on the predicted input variable value; and
   performing runtime execution of the query statement using the selected access path.

2. The computer implemented method of claim 1, wherein the predicting the input variable value associated to the input variable includes interrogating a predictive model for return of the predicted input variable value, wherein the predictive model has been trained with training data that includes historical input variable values determined for the input variable.

3. The computer implemented method of claim 1, wherein the predicting the input variable value associated to the input variable includes interrogating a predictive model for return of the predicted input variable value, wherein the predictive model has been trained with training data that includes historical input variable values determined for the input variable, wherein the interrogating the predictive model for return of the predicted input variable value includes interrogating the predictive model with use of query data that includes a context parameter value set that specifies attributes of a workload associated to the received incoming query statement, the context parameter values set extracted from a message received from an enterprise system that includes the incoming query statement.

4. The computer implemented method of claim 1, wherein the predicting the input variable value associated to the input variable includes interrogating a predictive model for return o f the predicted input variable value, wherein the predictive model has been trained with training data that includes historical input variable values determined for the input variable, wherein the method includes determining whether the predictive model is returning predictions according to a threshold satisfying level of accuracy, and wherein the method includes performing the interrogating the predictive model responsively to a determining that the predictive model is returning predictions according to the threshold satisfying level of accuracy.

5. The computer implemented method of claim 1, wherein the predicting the input variable value associated to the input variable includes interrogating a predictive model for return of the predicted input variable value, wherein the predictive model has been trained with training data that includes historical input variable values determined for the input variable, wherein the method includes determining whether the predictive model is returning predictions according to a threshold satisfying level of accuracy, wherein the method includes performing the interrogating the predictive model responsively to a determining that the predictive model is returning predictions according to the threshold satisfying level of accuracy, and wherein the determining whether the predictive model is returning predictions according to a threshold satisfying level of accuracy includes comparing forecasts returned using the predictive model to ground truth data defined by holdout data of the training data that includes historical input variable values.

6. The computer implemented method of claim 1, wherein the predicting the input variable value associated to the input variable includes interrogating a predictive model for return of the predicted input variable value, wherein the predictive model has been trained with training data that includes historical input variable values determined for the input variable, wherein the query statement includes a second query statement expression having a second input variable, wherein the method includes interrogating a second predictive model for return of a second input variable value associated to the second input variable value, wherein the selecting the access path for runtime execution of the query statement in dependence on the predicted input variable value includes selecting the access path for runtime execution of the query statement in dependence on the predicted input variable value and in dependence on the second input variable value.

7. The computer implemented method of claim 1, wherein the predicting the input variable value associated to the input variable includes interrogating a predictive model for return of the predicted input variable value, wherein the predictive model has been trained with training data that includes historical input variable values determined for the input variable, wherein the query statement includes a second query statement expression having a second input variable, and wherein there is associated to the second input variable of the query statement a second predictive model that has been trained with training data that includes historical input variable values determined for the second input variable, wherein the method includes determining whether the predictive model is returning predictions according to a threshold satisfying level of accuracy, and determining whether the second predictive model is returning predictions according to a prediction threshold satisfying level of accuracy, wherein the method includes performing the interrogating the predictive model responsively to a determining that the predictive model is returning predictions according to the threshold satisfying level of accuracy, and wherein the method includes assigning a default filter factor for the second input variable without return of a prediction for a second input variable value for the second input variable responsively to a determining that the second predictive model is failing to return predictions according to the prediction threshold satisfying level of accuracy, and wherein the selecting the access path for runtime execution of the query statement in dependence on the predicted input variable value includes selecting the access path for runtime execution of the query statement in dependence on the predicted input variable value and in dependence on the default filter factor.

8. The computer implemented method of claim 1, wherein the selecting an access path includes performing cost scoring of a plurality of candidate access paths and identifying a lowest cost access path of the plurality of access paths as the access path for runtime execution of the query statement, wherein the method includes examining historical data to determine a table trend classification for a table associated to the input variable value, and wherein the performing cost scoring of the plurality of candidate access paths includes performing cost scoring of the plurality of candidate access paths in dependence on the table trend classification.

9. The computer implemented method of claim 1, wherein the predicting includes interrogating a predictive model which has been trained by machine learning.

10. The computer implemented method of claim 1, wherein the predicting includes interrogating a predictive model which has been trained by machine learning, and wherein the method further includes determining, during the runtime execution of the query statement, the input variable value associated to the predicted input variable value, and using the determined input variable value to train the predictive model.

11. The computer implemented method of claim 1, wherein the predicting includes interrogating a predictive model which has been trained by machine learning to curve fit time series data defined by input variable values associated to prior instances of runtime execution of the incoming query statement.

12. The computer implemented method of claim 1, wherein the predicting includes interrogating a predictive model which has been trained by Fourier analysis based machine learning to curve fit training data provided by time series data, the time series data defined by input variable values associated to prior instances of runtime execution of the incoming query statement.

13. A computer program product comprising:
   a computer readable storage medium readable by one or more processing circuit and storing instructions for execution by one or more processor for performing a method comprising:
   receiving an incoming query statement, wherein the incoming query statement comprises a query statement expression that includes an input variable;
   predicting an input variable value associated to the input variable;
   selecting an access path for runtime execution of the query statement in dependence on the predicted input variable value; and
   performing runtime execution of the query statement using the selected access path.

14. The computer program product of claim 13, wherein the predicting the input variable value associated to the input variable includes interrogating a predictive model for return of the predicted input variable value, wherein the predictive model has been trained with training data that includes historical input variable values determined for the input variable.

15. The computer program product of claim 13, wherein the predicting the input variable value associated to the input variable includes interrogating a predictive model for return of the predicted input variable value, wherein the predictive model has been trained with training data that includes historical input variable values determined for the input variable, wherein the interrogating the predictive model for return of the predicted input variable value includes interrogating the predictive model with use of query data that includes a context parameter value set that specifies attributes of a workload associated to the received incoming query statement, the context parameter values set extracted from a message received from an enterprise system that includes the incoming query statement.

16. The computer program product of claim 13, wherein the predicting the input variable value associated to the input variable includes interrogating a predictive model for return of the predicted input variable value, wherein the predictive model has been trained with training data that includes historical input variable values determined for the input variable, wherein the method includes determining whether the predictive model is returning predictions according to a threshold satisfying level of accuracy, and wherein the method includes performing the interrogating the predictive model responsively to a determining that the predictive model is returning predictions according to the threshold satisfying level of accuracy.

17. The computer program product of claim 13, wherein the predicting the input variable value associated to the input variable includes interrogating a predictive model for return of the predicted input variable value, wherein the predictive model has been trained with training data that includes historical input variable values determined for the input variable, wherein the method includes determining whether the predictive model is returning predictions according to a threshold satisfying level of accuracy, wherein the method includes performing the interrogating the predictive model responsively to a determining that the predictive model is returning predictions according to the threshold satisfying level of accuracy, and wherein the determining whether the predictive model is returning predictions according to a threshold satisfying level of accuracy includes comparing forecasts returned using the predictive model to ground truth data defined by holdout data of the training data that includes historical input variable values.

18. The computer program product of claim 13, wherein the predicting the input variable value associated to the input variable includes interrogating a predictive model for return of the predicted input variable value, wherein the predictive model has been trained with training data that includes historical input variable values determined for the input variable, wherein the query statement includes a second query statement expression having a second input variable, and wherein there is associated to the second input variable of the query statement a second predictive model that has been trained with training data that includes historical input variable values determined for the second input variable, wherein the method includes determining whether the predictive model is returning predictions according to a threshold satisfying level of accuracy, and determining whether the second predictive model is returning predictions according to a prediction threshold satisfying level of accuracy, wherein the method includes performing the interrogating the predictive model responsively to a determining that the predictive model is returning predictions according to the threshold satisfying level of accuracy, and wherein the method includes assigning a default filter factor for the second input variable without return of a prediction for a second input variable value for the second input variable responsively to a determining that the second predictive model is failing to return predictions according to the prediction threshold satisfying level of accuracy, and wherein the selecting the access path for runtime execution of the query statement in dependence on the predicted input variable value includes selecting the access path for runtime execution of the query statement in dependence on the predicted input variable value and in dependence on the default filter factor.

19. A system comprising:
a memory;
at least one processor in communication with the memory; and
program instructions executable by one or more processor via the memory to perform a method comprising:
receiving an incoming query statement, wherein the incoming query statement comprises a query statement expression that includes an input variable;
predicting an input variable value associated to the input variable;
selecting an access path for runtime execution of the query statement in dependence on the predicted input variable value; and
performing runtime execution of the query statement using the selected access path.

20. A computer implemented method comprising:
receiving an incoming query statement, wherein the incoming query statement comprises a query statement expression that includes an input variable;
selecting an access path for runtime execution of the query statement;
performing runtime execution of the query statement using the selected access path, wherein the performing runtime execution of the query statement includes determining an input variable value for the input variable;
applying the determined input variable value as training data for training a predictive model, wherein the predictive model is configured to return predictions for input variable values associated to the input variable;
receiving a subsequent instance of the incoming query statement, wherein the incoming query statement comprises the query statement expression that includes the input variable;
interrogating the predictive model to predict an input variable value for the input variable in the subsequent instance of the incoming query statement;
selecting an access path for runtime execution of the subsequent instance of the query statement in dependence on the predicted input variable value; and
performing runtime execution of the subsequent instance of the query statement using the selected access path.

21. The computer implemented method of claim 20, wherein the method includes determining whether the predictive model is returning predictions according to a threshold satisfying level of accuracy, wherein the method includes performing the interrogating the predictive model responsively to a determining that the predictive model is returning predictions according to the threshold satisfying level of accuracy.

22. The computer implemented method of claim 20, wherein the method includes determining whether the predictive model is returning predictions according to a threshold satisfying level of accuracy, wherein the method includes performing the interrogating the predictive model responsively to a determining that the predictive model is returning predictions according to the threshold satisfying level of accuracy, and wherein the determining whether the predictive model is returning predictions according to a threshold satisfying level of accuracy includes comparing forecasts returned using the predictive model to ground truth data defined by holdout data of the training data that includes historical input variable values used for training the predictive model.

23. A system comprising:
a memory;
at least one processor in communication with the memory; and
program instructions executable by one or more processor via the memory to perform a method comprising:
receiving an incoming query statement, wherein the incoming query statement comprises a query statement expression that includes an input variable;
selecting an access path for runtime execution of the query statement;
performing runtime execution of the query statement using the selected access path, wherein the performing runtime execution of the query statement includes determining an input variable value for the input variable;
applying the determined input variable value as training data for training a predictive model, wherein the predictive model is configured to return predictions for input variable values associated to the input variable;
receiving a subsequent instance of the incoming query statement, wherein the incoming query statement comprises the query statement expression that includes the input variable;
interrogating the predictive model to predict an input variable value for the input variable in the subsequent instance of the incoming query statement;
selecting an access path for runtime execution of the subsequent instance of the query statement in dependence on the predicted input variable value; and
performing runtime execution of the subsequent instance of the query statement using the selected access path.

24. The system of claim 23, wherein the method includes determining whether the predictive model is returning predictions according to a threshold satisfying level of accuracy, wherein the method includes performing the interrogating the predictive model responsively to a determining that the predictive model is returning predictions according to the threshold satisfying level of accuracy.

25. The system of claim 23, wherein the method includes determining whether the predictive model is returning predictions according to a threshold satisfying level of accuracy, wherein the method includes performing the interrogating the predictive model responsively to a determining that the predictive model is returning predictions according to the threshold satisfying level of accuracy, and wherein the determining whether the predictive model is returning predictions according to a threshold satisfying level of accuracy includes comparing forecasts returned using the predictive model to ground truth data defined by holdout data of the training data that includes historical input variable values used for training the predictive model.

* * * * *